(12) United States Patent
Turaga et al.

(10) Patent No.: US 7,317,759 B1
(45) Date of Patent: Jan. 8, 2008

(54) SYSTEM AND METHODS FOR VIDEO COMPRESSION MODE DECISIONS

(75) Inventors: Deepak S. Turaga, Croton on Hudson, NY (US); Tsuhan Chen, Wexford, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 986 days.

(21) Appl. No.: 10/085,616

(22) Filed: Feb. 28, 2002

(51) Int. Cl.
*H04N 11/02* (2006.01)
*H04N 7/12* (2006.01)

(52) U.S. Cl. ............................ 375/240.01; 375/240.02; 375/240.08; 375/240.13

(58) Field of Classification Search ............ 375/240.08, 375/240.13, 240.16, 240.12
See application file for complete search history.

(56) References Cited

U.S. PATENT DOCUMENTS 6,507,616 B1 * 1/2003 Ryu ....................... 375/240.13
2002/0196854 A1 * 12/2002 Kim ....................... 375/240.17

OTHER PUBLICATIONS

Cheng-Tie Chen et al., 'A Self-Governing Rate Buffer Control Strategy for Pseudoconstant Bit Rate Video Coding', Jan. 1993, IEEE Transactions on image processing, vol. 2, No. 1, pp. 50-59.*
*Video Coding for Low Bit Rate Communication*, ITU-T recommendation H.263 Version 2, Jan. 1998.
J. Jain and A. Jain, "Displacement Measurement and Its Application in Interframe Image Coding." *IEEE Trans. on Commun.* Dec. 1981, pp. 1799-1808, vol. COM-29.

M. Alkanhal, D.S. Turaga and T. Chen, "Correlation Based Search Algorithms for Motion Estimation," *Picture Coding Symposium*, Apr. 1999, pp. 99-102.
M. Chen and A. Willson, Jr., "Rate-Distortion Optimal Motion Estimation Algorithm for Video Coding," *Proc. International Conference on Acoustics Speech and Signal Processing*, 1996, pp. 2096-2099.
Y.-K. Chen and S. Y. Kung, "Rate Optimization by True Motion Estimation," *Proc. IEEE Workshop on Multimedia Signal Processing*, Jun. 1997, pp. 187-194.
J.-B. Xu, L.-M. PO and C.-K. Cheung, "A New Prediction Model Search Algorithm for Fast Block Motion Estimation," *Proc. International Conference on Image Processing*, Oct. 1997, pp. 610-3, vol. (Iil+951+892+748).
S.-K. Weng, C.-M. Kuo and C.-H. Hsieh, "Motion estimation algorithm for Image sequence coding," *IEE Optical Engineering*, Dec. 1997, pp. 3272-3280, vol. 36, No. 12.
J. Li, X, Lin and Y. Wu, "Multiresolution tree architecture with its application in video sequence coding: A new result," *Proc. SPIE Visual Communication and Image Processing*, 1993, pp. 730-741, vol. 2094.

(Continued)

*Primary Examiner*—Gims Philippe
*Assistant Examiner*—Erick Rekstad
(74) *Attorney, Agent, or Firm*—Kirkpatrick & Lockhart Preston Gates Ellis LLP

(57) ABSTRACT

A method for making a mode decision in video coding. The method includes collecting a first portion of video data and labeling the first portion of video data with an optimal mode. The method also includes identifying a feature of the first portion of video data corresponding to the optimal mode and making a mode decision for a second portion of the video data based on a value of the feature in the second portion of the video.

20 Claims, 13 Drawing Sheets

OTHER PUBLICATIONS

J. Chalidabhongse and C.-C. J. Kuo, "Fast Motion Vector Estimation Using Multiresolution Spatio-Temporal Correlations," *IEEE Trans. on Circuits and Syst. for Video Technol.,* Jun. 1997, pp. 477-488, vol. 7, No. 3.

R. Li, B. Zeng and M.L. Liou, "A New Three-Step Search Algorithm for Block Motion Estimation," *IEEE Trans. on Circuits and Systems for Video Technology,* Aug. 1994, pp. 438-442, vol. 4, No. 4.

L. Po and W. Ma, "A Novel Four-Step Search Algorithm for Fast Block Motion Estimation," *IEEE Trans. on Circuits and Systems for Video Technology,* Jun. 1996, pp. 313-317, vol. 6, No. 3.

J.Y. Tham et al., "A Novel Unrestricted Center-Biased Diamond Search Algorithm for Block Estimation," *IEEE Trans. on Circuits and Systems for Video Technology,* Aug. 1998, pp. 369-377, vol. 8, No. 4.

M.T. Orchard and G.J. Sullivan, "Overtapped Block Motion Compensation—An Estimation-Theoretic Approach," *IEEE Transactions on Image Processing,* Sep. 1994, pp. 693-699, v3(5).

T. Wiegand, et al., "Rate-Distortion Optimized Mode Selection for Very Low Bit Rate Video Coding and the Emerging H.263 Standard," *IEEE Trans. on Circuits and Systems for Video Technology,* pp. 182-190, vol. 6. No. 2.

J.Lu and M.L. Liou, "A Simple and Efficient Search Algorithm for Block-Matching Motion Estimation," *IEEE Trans. on Circuits and Systems for Video Technology,* Apr. 1997, vol. 7, No. 2.

D. Turaga and T. Chen, "Estimation and Mode Decision for Spatially Correlated Motion Sequences," *CMU Technical Report,* Feb. 2001.

T.V. Lakshman, A. Ortega and A.R. Reibman, "VBR Video: Tradeoffs and Potentials," *Proc. IEEE,* May 1998, pp. 952-973, vol. 86.

R.O. Duda and P.E. Hart, *Pattern Classification and Scene Analysis,* 1973, pp. 10-129, Wiley, New York.

G. McLachlan and T. Krishnan, *The EM Algorithm and Extensions,* 1996, pp. 45-109, Interscience, New York.

S. Wolf and M.H. Pinson, "Spatial-temporal distortion metrics for in-service quality monitoring of any digital video system," *SPIE Int. Symp. Voice, Video and Data Communications,* Sep. 11-12, 1999, Boston, MA.

G.D. Forney, Jr., "The Viterbi Algorithm," *Proc. IEEE,* Mar. 1973, pp. 268-278, vol. 61.

Deepak S. Turaga and Tsuhan Chen, "Classification Based Mode Decisions for Video over Networks," *IEEE Transactions on Multimedia,* Mar. 2001, pp. 41-52, vol. 3, No. 1.

Deepak S. Turaga and Tsuhan Chen, "Estimation and Mode Decision for Spatially Correlated Motion Sequences," Accepted for Publication in *IEEE Trans. On Circuits and Systems for Video Technology,* 2001.

Hwangjun Song, Jongwon Kim and C.-C. Jay Kuo, "Real-time Encoding Frame Rate Control for H.263+ Video over the Internet," *Signal Processing: Image Commun.,* Sep. 1999, pp. 1-29, No. 15.

Fernando C. M. Martins, Wei Ding and Ephraim Feig, "Joint Control of Spatial Quantization and Temporal Sampling for Very Low Bit Rate Video," *IEEE Intl Conf. on Acoustics, Speech and Signal Processing,* 1996, pp. 2072-2074, 2091.

Tihao Chiang and Ya-Qin Zhang, "A New Rate Control Scheme Using Quadratic Rate Distortion Model," *IEEE Transactions On Circuits and Systems for Video Technology,* Feb. 1997, pp. 246-50, vol. 7, No. 1.

Chi-Yuan Hsu, Antonio Ortega and Amy R. Reibman, "Joint Selection of Source and Channel Rate for VBR Video Transmission Under ATM Policing Constraints," *IEEE Journal on Selected Areas in Communications,* Aug. 1997, pp. 1016-1028, vol. 15, No. 6.

Wei Ding and Bede Liu, "Rate Control of MPEG Video Coding and Recording by Rate-Quantization Modeling," *IEEE Transactions on Circuits and Systems for Video Technology,* Feb. 1996, pp. 12-20, vol. 6, No. 1.

Cheng-Tie Chen and Andria Wong, "A Self-Governing Rate Buffer Control Strategy for Pseudoconstant Bit Rate Video Coding," *IEEE Transactions on Image Processing,* Jan. 1993, pp. 50-59, vol. 2, No. 1.

Jinho Choi and Daechul Park, "A Stable Feedback Control of the Buffer State Using the Controlled Lagrange Multiplier Method," *IEEE Transactions on Image Processing,* Sep. 1994, pp. 546-558, vol. 3, No. 5.

Deepak Srinivas Turaga, "Statistical Modeling for Networked Video: Coding Optimization, Error Concealment and Traffic Analysis," A Dissertation Submitted to the Graduate School in Partial Fulfillment of the Requirements for the Doctor of Philosophy in Electrical and Computer Engineering, Jul. 2001, Carnegie Mellon University, Pittsburgh, Pennsylvania.

* cited by examiner

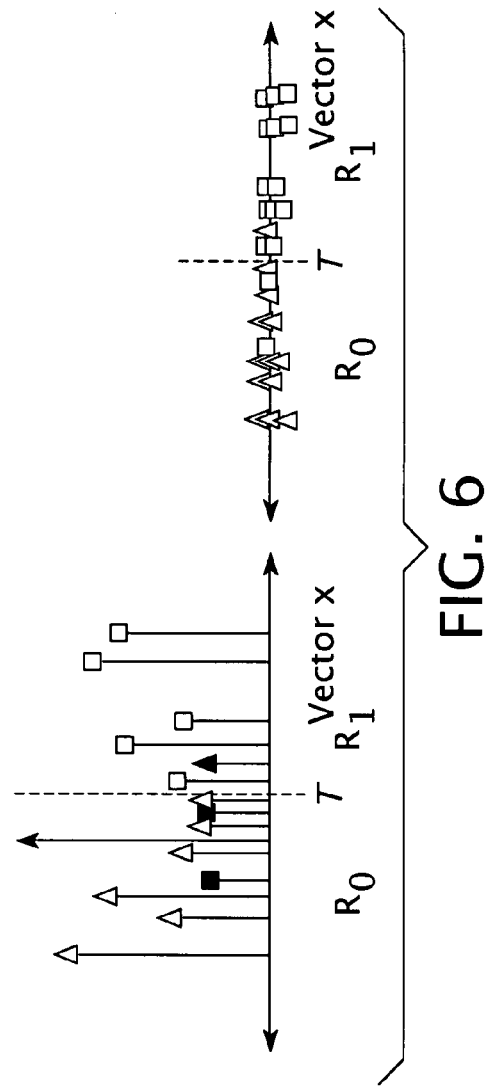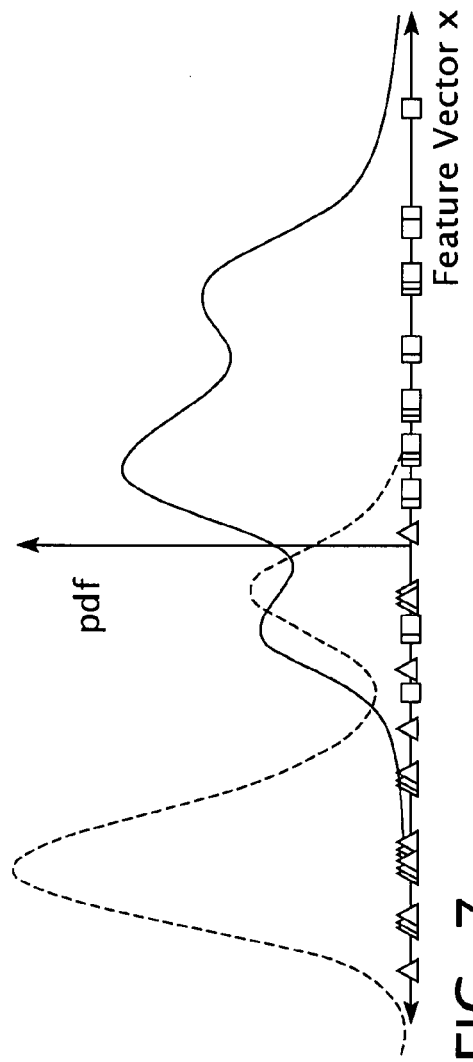

SYSTEM AND METHODS FOR VIDEO COMPRESSION MODE DECISIONS

BACKGROUND OF THE INVENTION

Video encoders convert raw video data into a standard-specified bit stream. The bit stream is then transmitted over a communications medium and reconstructed into video by a video decoder. The conversion from video to bit stream is performed to achieve compression without sacrificing the quality of the reconstructed video. Thus, encoders must perform well in terms of a speed-quality-bit rate tradeoff. Coding processes, therefore, allow for the improvement of various parameters by allowing for mode decisions to be made. Video standards such as, for example, MPEG and H.263 specify the form of the bit stream syntax, but allow for some encoding optimizations such as, for example, algorithm optimization and mode decision optimization. Such optimizations may be desirable when a particular application for an encoder calls for an improvement in one or more of the parameters in the speed-quality-bit rate tradeoff than is called for with another application. For example, when an application requires real-time encoding, the speed of the coding becomes critical. However, when an application calls for off-line coding, the quality and the coding efficiency may be more critical.

Prior to the present invention, an exhaustive approach to mode selection in the coding process was often used. In such an exhaustive approach, each possible mode is tried for each mode decision, the cost corresponding to each mode is evaluated, and the mode with the lowest cost is selected. Such an approach is oftentimes impractical due to complexity and processing time issues.

SUMMARY OF THE INVENTION

The present invention, one embodiment, is directed to a method for making a mode decision in video coding. The method includes collecting a first portion of video data and labeling the first portion of video data with an optimal mode. The method also includes identifying a feature of the first portion of video data corresponding to the optimal mode and making a mode decision for a second portion of the video data based on a value of the feature in the second portion of the video.

The present invention, in another embodiment, is directed to a method of coding a sequence of video. The method includes extracting at least one sample unit of the video, defining at least one training feature vector and an associated cost with the vector for the sample unit, and defining a training feature space associated with the feature vector. The method also includes transforming the feature space, constructing a probabilistic model for the feature space, and calculating a likelihood ratio for a second unit of the video. The method further includes selecting a hypothesis that is believed to be true for the second unit of the video, making a mode decision based on the selected hypothesis, and coding the second unit of the video using the mode decision.

The present invention, in one embodiment, is directed to a video encoder including a set of instructions which, when executed by the encoder, cause the encoder to collect a first portion of video data, label the first portion of video data with an optimal mode, identify a feature of the first portion of video data corresponding to the optimal mode, and make a mode decision for a second portion of the video data based on a value of the feature in the second portion of the video.

BRIEF DESCRIPTION OF THE DRAWINGS

Further advantages of the present invention may be better understood by referring to the following description taken in conjunction with the accompanying drawings, in which:

FIG. 6 illustrates a modified feature space according to one embodiment of the present invention;

FIG. 7 illustrates trained Gaussian mixtures in a modified feature space according to one embodiment of the present invention;

DETAILED DESCRIPTION OF PREFERRED EMBODIMENTS

Figure 1:
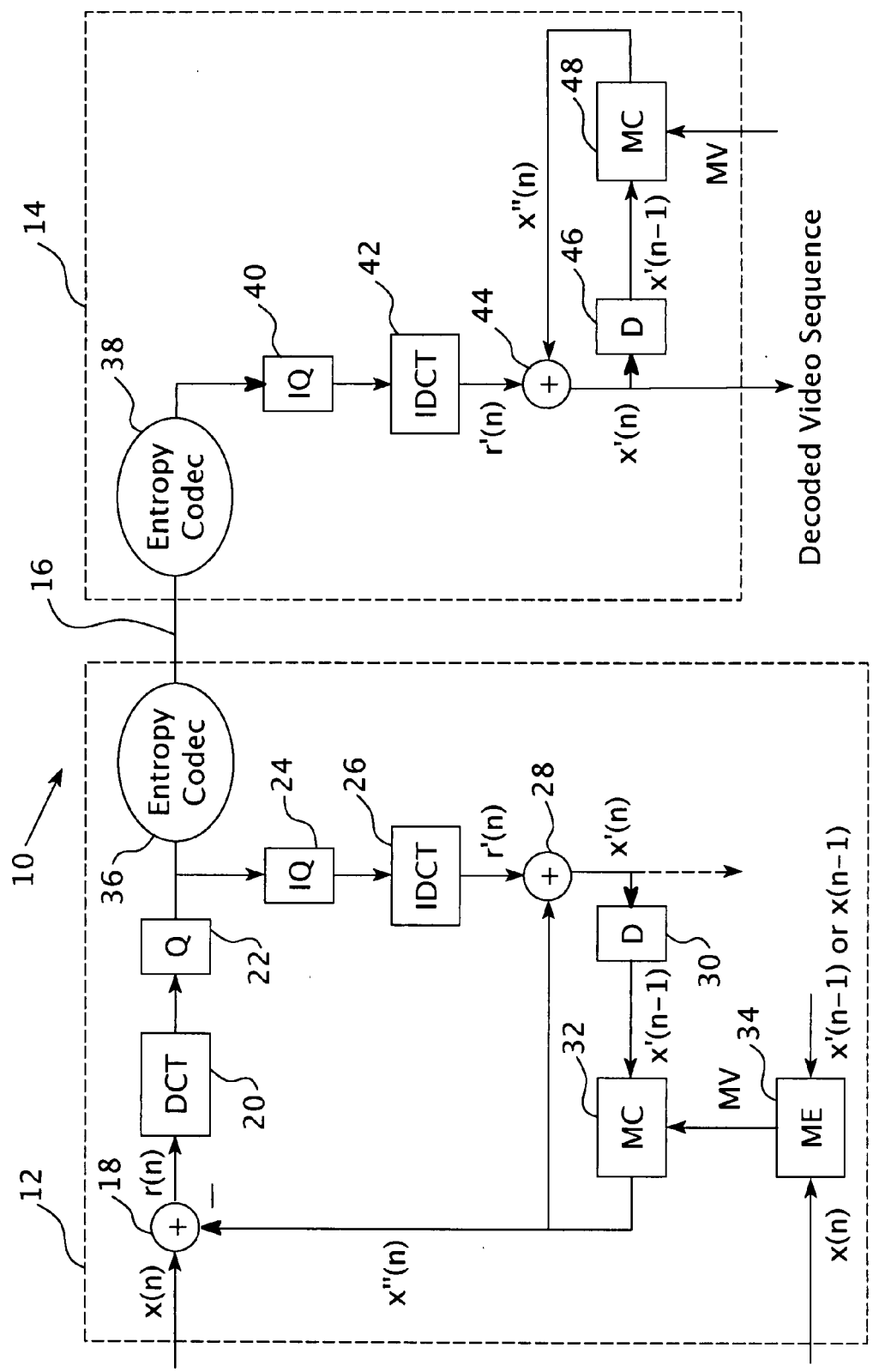
FIG. 1 illustrates a diagram of a video transmission system in which the present invention may be incorporated.

FIG. 1 illustrates a diagram of a video transmission system 10 in which the present invention may be incorporated. The system 10 can be configured to implement any type of video compression/decompression standard such as, for example, MPEG or H.263. The system 10 includes a video encoder 12 and a video decoder 14. The encoder 12 and the decoder 14 are in communication via a transmission medium 16. The medium 16 may be, for example, a computer network or a digital storage medium such as, for example, a digital video (versatile) disc (DVD).

A current video frame $x(n)$ is input to the encoder 12. A summing block 18 creates a residue $r(n)$ by subtracting a prediction for the current video frame $x''(n)$ from $x(n)$. The residue $r(n)$ is transformed by discrete cosine transformer 20 and quantized by quantizer 22. The transformed and quantized residue enters an inverse quantizer 24 and an inverse discrete cosine transformer 26 to produce a decoded residue $r'(n)$. Summing block 28 adds the decoded residue $r'(n)$ to the prediction for the current video frame $x''(n)$ to create a reconstructed frame $x'(n)$. The reconstructed frame enters a delay block 30 to produce a delayed reconstructed frame x'(n−1), which enters a motion compensator 32. The compensator 32 uses a motion vector MV to create the prediction for the current frame x"(n). The motion vector MV is generated by a motion estimator using the current frame x(n) and either a delayed current frame x(n−1) or the delayed reconstructed frame x'(n−1).

The transformed and quantized residue also enters a first entropy codec 36. The codec 36 creates entropy coded segments using a compression technique such as, for example, Huffman coding, for transmission on the medium 16. A second entropy codec 38 decodes the entropy coded segments, which then enter an inverse quantizer 40 and an inverse discrete cosine transformer 42 to create a decoded residue r'(n). Summing block 44 adds the decoded residue r'(n) to the prediction for the current frame x"(n) to create the reconstructed frame x'(n). The series of reconstructed frames x'(n) comprise the decoded video sequence. The reconstructed frame x'(n) also enters a delay block 46 and a motion compensator 48. The compensator 48 uses a motion vector to produce the prediction for the current frame x"(n).

The present invention is used to make mode decisions during encoding by the video encoder 12. For example, the present invention can be used to determine the optimal number of bits to be used by the quantizer 22 to code, for example, a particular frame, a particular block (i.e. an 8×8 pixel area) or a particular macroblock (i.e. a 16×16 pixel area). The present invention may be used for any type of mode decision such as, for example, inter- and intra-mode decisions, frame type selection decisions, and frame skipping or coding decisions. During a training period, features are extracted for each unit (e.g. a frame, macroblock, or block) of a sample of video data and a mode distribution is calculated using classification theory. The classifications may then be used to encode the entire video data or a portion thereof.

Figure 2:
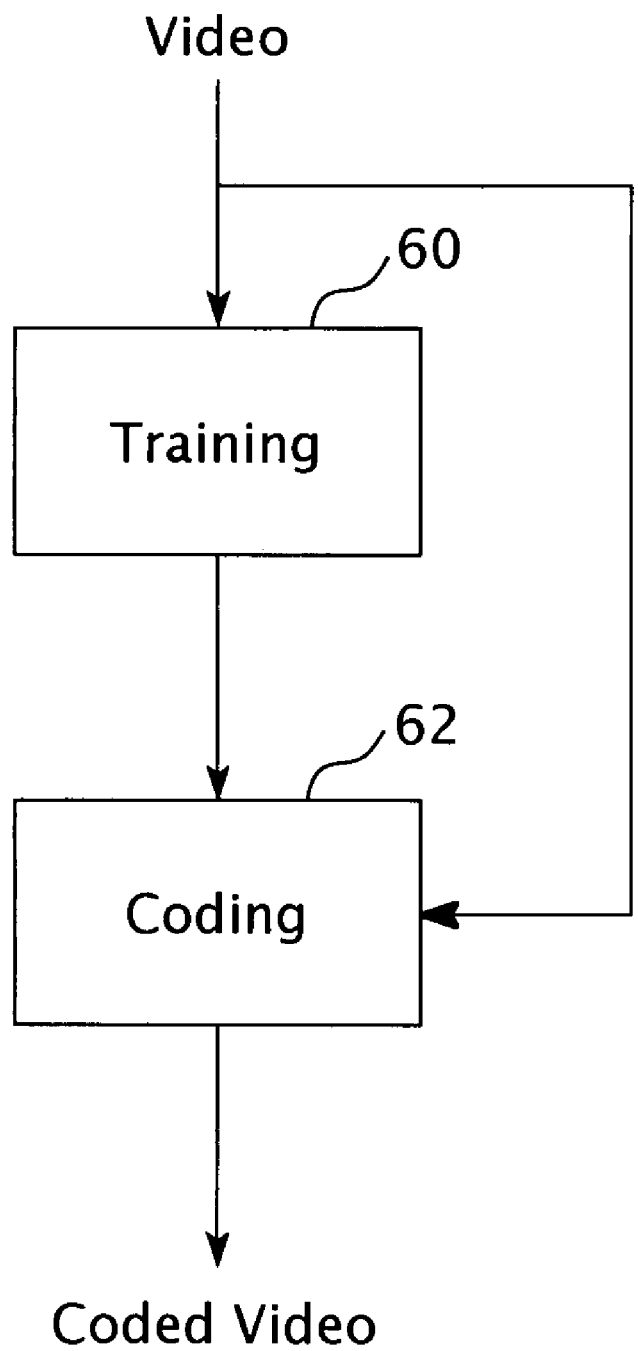
FIG. 2 illustrates a flowchart of an embodiment of an overview of a process for encoding video by making classification-based mode decisions.

FIG. 2 illustrates a flowchart of an embodiment of an overview of a process for encoding video by making classification-based mode decisions. It can be understood by those skilled in the art that the methods described herein may be embodied in software that may be resident on the encoder 12 or may be a portion of the software that comprises the encoder 12. At step 60, the algorithm of the present invention is trained, as described hereinbelow, by determining an optimal mode for the sample and identifying at least one feature that corresponds to the mode. At step 62, the video is coded using mode decisions that are based on the results of the training step 60.

Figure 3A:
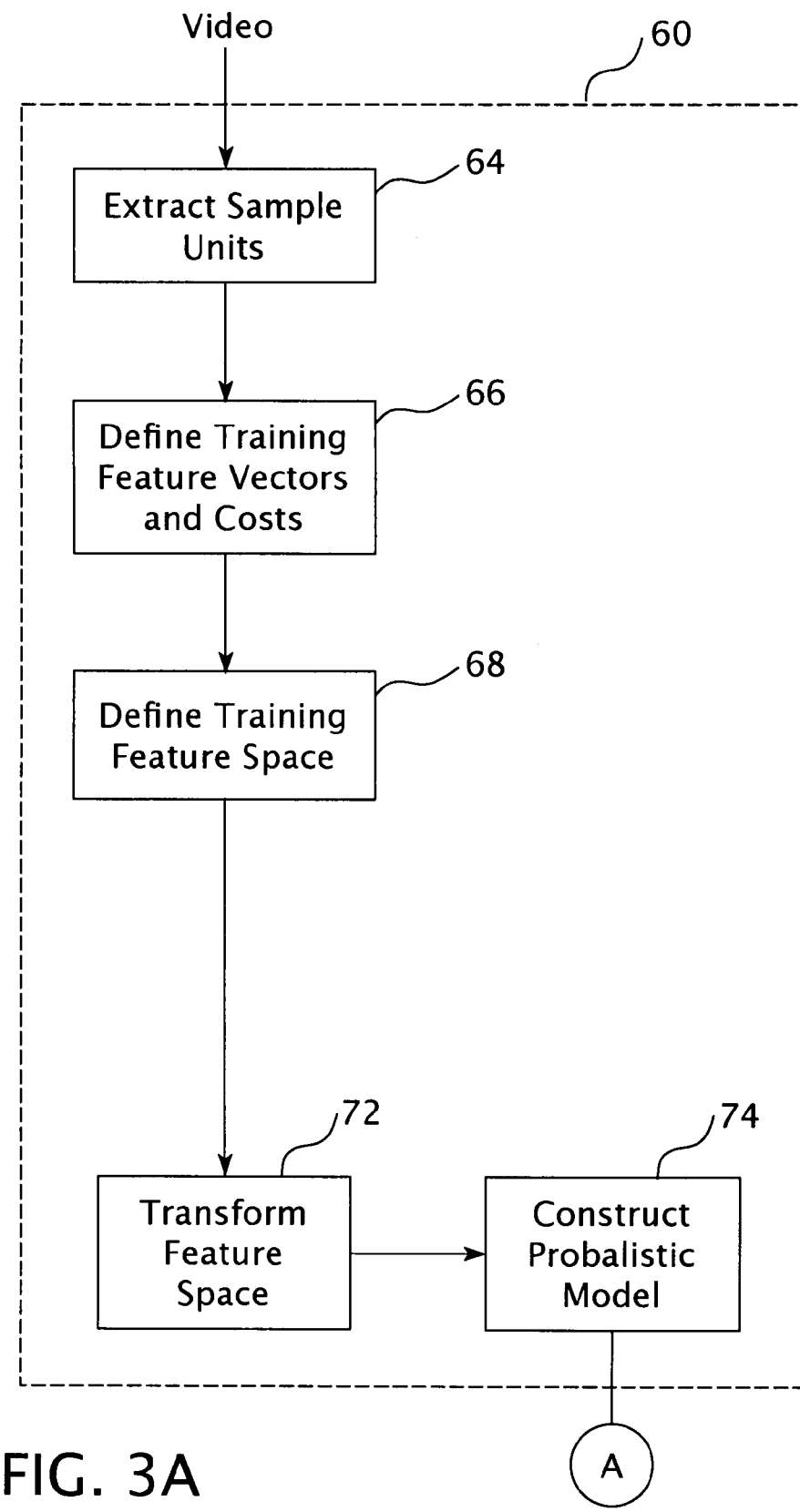
FIGS. 3A and 3B illustrate a more detailed flowchart of an embodiment of the process of FIG. 2.
Figure 3B:
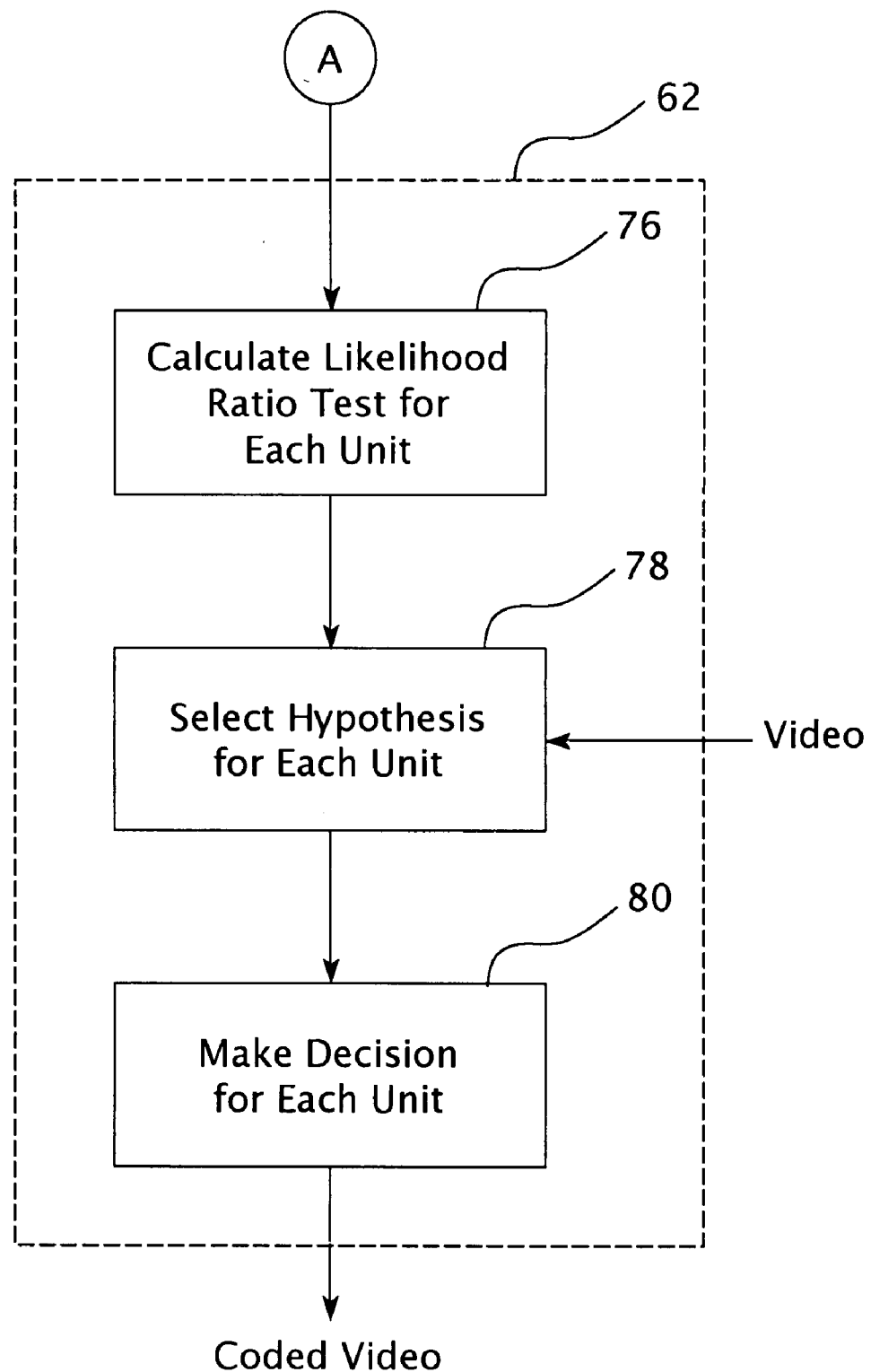

FIGS. 3A and 3B illustrate a more detailed flowchart of an embodiment of the process of FIG. 2. In the description herein, $c_0$ represents the cost for making a decision $D_0$ and $c_1$ represents the cost for making a decision $D_1$ for a particular coding unit. The decisions $D_0$ and $D_1$ may include mode decisions that may be at different levels of the coding process, i.e., at different coding units. For instance, the decisions could be at the macroblock level, with one macroblock being the coding unit, where $D_0$ could be to decide to code the macroblock using Intra coding and $D_1$ could be to decide to code the macroblock using Inter coding. The decisions could also be at the frame level, with one frame being the coding unit, where $D_0$ and $D_1$ represent whether to code or skip the frame. The costs $c_i$ could include the number of bits needed to code a block or frame given that a particular decision has been made. The cost could also include the distortion introduced in the decoded video and the time needed to encode the video according to the decision. The goal is oftentimes to make the decision that minimizes the cost. Thus, every time a decision is to be made, it may be desirable to make one that results in the smaller cost. This strategy may be summarized as:

$$\begin{cases} \text{Choose } D_0, \text{ if } c_0 < c_1 \text{ or } c_0 - c_1 < 0 \\ \text{Choose } D_1, \text{ if } c_1 < c_0 \text{ or } c_0 - c_1 > 0. \end{cases} \quad (1)$$

In principle, to make the optimal mode decision one can try all the modes and choose the mode that has the lowest cost. However, computing the actual costs $c_i$ before making a decision may be computationally intensive because it involves trying either decision to determine the cost. In order to reduce the computational burden for the decision scheme it may be desirable to identify features that provide a good estimate of the cost for a decision, but do not require as much computation to evaluate. It may thus be desirable to identify features that allow for an estimate of which of the two following hypotheses $H_0$ or $H_1$ is true, where:

$$H_0 : c_0 - c_1 < 0 \quad (2)$$
$$H_1 : c_0 - c_1 > 0.$$

For each coding unit K features are identified that are grouped together in a feature vector $x=[x_0, x_1, \ldots x_{K-1}]^T$. In the optimal scenario features could be found that perfectly represent the cost needed for a decision. However, in many practical applications such features may be difficult to find. In many practical applications, the decision strategy thus becomes sub-optimal in terms of minimizing the cost. However, this sub-optimality may be sufficient because of its smaller computational requirements.

A classifier may be built that takes as an input the feature vector x of each coding unit and determines the probability that $H_0$ or $H_1$ is true, which would then enable appropriate decision-making. Such a classifier may be derived by training it with sample data. At steps 64 and 66, a set of M coding units may be selected that have corresponding feature vectors $x_0, x_1, \ldots x_{M-1}$ and associated with each of these feature vectors is a cost difference $d_i = c_{0i} - c_{1i}$ with $c_{0i}$ and $c_{1i}$ being the true costs for decisions $D_0$ and $D_1$, respectively, for the ith coding unit. P of the coding units have $d_i < 0$, i.e., corresponding to when $H_0$ is true and Q of the coding units have $d_i > 0$, corresponding to when $H_1$ is true, with P+Q=M. For purposes of illustration, the two sets of training vectors for a one-dimensional feature vector are shown in FIG. 4.

Figure 4:
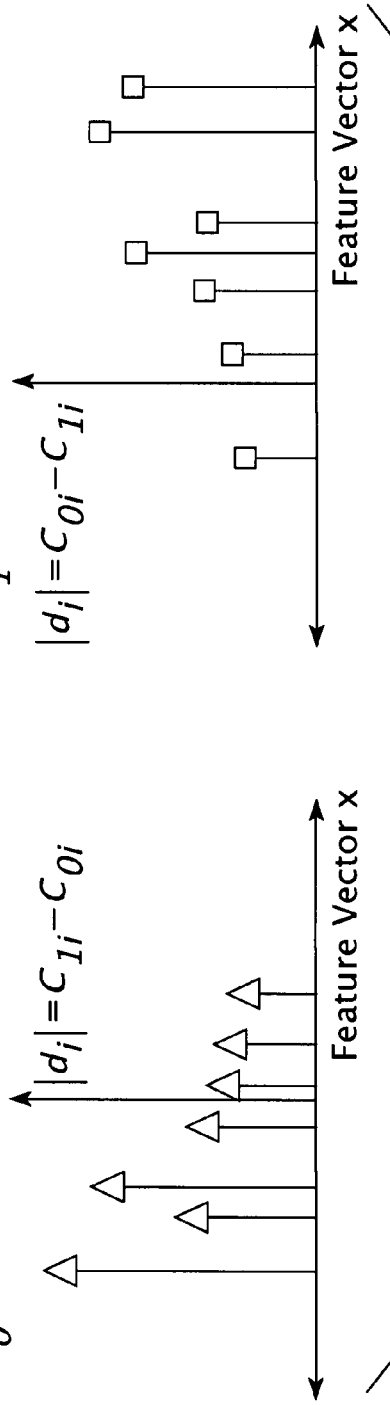
FIG. 4 illustrates two sets of training vectors for a one-dimensional feature vector according to one embodiment of the present invention.

In FIG. 4, the x-axis for both the cases corresponds to the value of the feature vector x (a 1-D vector is used for illustration) for each coding unit and the y-axis corresponds to the magnitude of the cost difference $|d_i|$ between the two mode decisions for that coding unit. Feature vectors of coding units for which $H_0$ is true are shown on the left and are represented with triangles and feature vectors of coding units for which $H_1$ is true are shown on the right and represented with squares.

Figure 5:
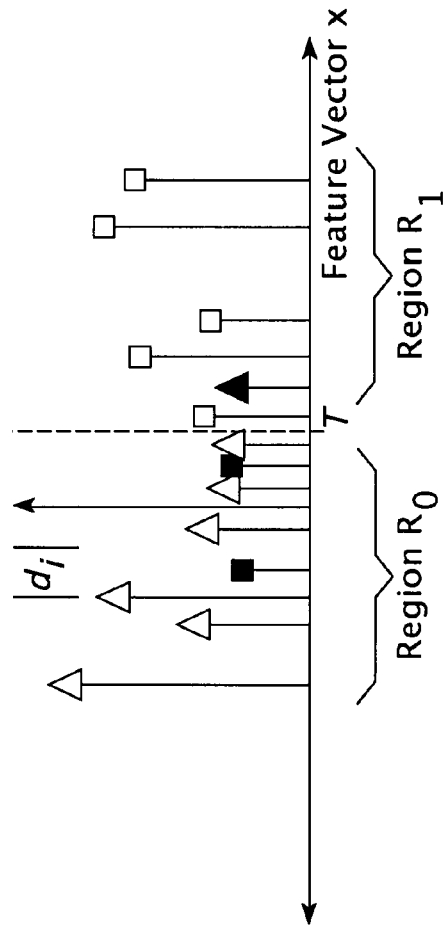
FIG. 5 illustrates a combined training feature space according to one embodiment of the present invention.

The magnitude difference $|d_i|$ for any coding unit corresponds to the additional cost that has to be paid if the wrong mode decision for that unit is made. For instance, if a decision $D_1$ is made instead of the right decision $D_0$ for one of the coding units represented by triangles, a cost $c_{1i}$ is incurred instead of the smaller cost $c_{0i}$. Thus, an additional cost $|d_i| = c_{1i} - c_{0i}$ is paid. At step 68 of FIG. 3A, the two plots from FIG. 4 may be combined to obtain the entire training feature space as is shown in FIG. 5.

All the feature vectors corresponding to the M coding units are shown on the same plot and triangles and squares are used to separate the data into the two classes. The feature space is partitioned using the classifier so that the total additional cost that has to be paid for misclassification, i.e. making the wrong decision for any coding unit, is as small as possible. For instance, the space may be partitioned into two regions, $R_0$ and $R_1$, using the threshold T as shown in FIG. 5. The decision $D_0$ may be made for all coding units with feature vectors to the left of the threshold, i.e. in $R_0$, and decision $D_1$ for all coding units with feature vectors to the right of the threshold, i.e. in $R_1$. For such a case the additional cost [$d_i$] is paid for each of the misclassified coding units, i.e. squares in $R_0$ and triangles in $R_1$. In FIG. 5, these are shown as dark triangles and squares, as opposed to the lightly colored triangles and squares, for which the right decision is made.

It may be desirable for the mode decisions to result in as small a total cost as possible. In order to do this $R_0$ and $R_1$ are chosen so that the total additional cost from making wrong mode decisions is minimized. This kind of a problem of partitioning the feature space in order to minimize the total cost is similar to traditional classification theory, except that in traditional classification theory the vertical axis corresponds to the probability densities of the feature vectors under the different hypotheses, while in the present invention this corresponds to the additional cost that has to be paid when a wrong decision is made. Hence, in order to use traditional classification techniques to solve the problem, the problem can be modified to fit the classification scenario.

The problem of minimizing the total additional cost may be mathematically written as follows:

$$\min_{R_0,R_1} \left[ \sum_{\substack{x_i \in R_0 \\ d_i > 0}} |d_i| + \sum_{\substack{x_i \in R_1 \\ d_i < 0}} |d_i| \right] \quad (3)$$

The two regions $R_0$ and $R_1$ should, in one embodiment, together span the entire space, and have no common sub-regions. However, no constraints are imposed on the shapes of these regions as long as they satisfy the minimization requirement. The regions may consist of noncontiguous sub-regions and the boundaries between them may be arbitrarily shaped. Hence, the problem of minimization is formulated in terms of choosing the regions and not in terms of specifying linear boundaries or thresholds separating them. Let $N_0 = \Sigma_{d_1 < 0} |d_1|$ and $N_1 = \Sigma_{d_1 > 0} |d_1|$. The minimization problem may be equivalently written as follows:

$$\min_{R_0,R_1} \left[ \frac{N_1}{N_0+N_1} \sum_{\substack{x_i \in R_0 \\ d_i > 0}} \frac{|d_i|}{N_1} + \frac{N_0}{N_0+N_1} \sum_{\substack{x_i \in R_1 \\ d_i < 0}} \frac{|d_i|}{N_0} \right]. \quad (4)$$

As mentioned hereinabove, standard classification techniques may be used to solve the problem and identify the regions $R_0$ and $R_1$. Such techniques involve estimating the probability density function (pdf) of the feature vector under the different hypotheses and then using the pdfs to identify the best regions. However, the feature vectors in the present problem are different from the feature vectors typically used in classification problems. This is because the vectors not only have a certain value, but also a height (corresponding to the additional cost) associated with them. In the typical classification scenario the vectors do not have this additional associated height. The feature vectors with their associated heights are thus converted to vectors that do not have the additional heights at step 72 of FIG. 3A. The partitioning may be done without losing the important information that the heights carry. The transformation may be done by replacing a vector with height $|d_1|$ with $|d_1|$ vectors at that location. In general it is not necessary that all the heights $|d_1|$ are integers. However, without loss of generality the heights can be scaled appropriately to make them integers. The feature space may be modified as illustrated in FIG. 6.

As illustrated in FIG. 6, each vector in the old (original) feature space (i.e., feature space with vectors having heights) is replaced by multiple vectors at that location, the number of new vectors being equal to the height associated with the original vector. Standard classification techniques may be applied in the new feature space to estimate the pdfs for the new set of vectors. The minimization problem is rewritten in the new feature space and then mapped to the well-known minimum probability of error classification problem. Prior techniques, such as those described in Duda et al., "Pattern Classification and Scene Analysis," Wiley and Sons, 1973, which is incorporated herein by reference, can be used to find the regions that minimize the criteria in the new feature space. Because of the way the old feature space is transformed to the new feature space, the regions in the new feature space are identical to the regions desired in the original feature space. This is because none of the training data points is displaced from their original positions. The details of such a scheme are presented hereinbelow.

In the new feature space $N_0$ is the total number of triangles and $N_1$ is the total number of squares, where $N_0$ and $N_1$ are as defined hereinabove. Two new hypotheses may be defined as follows:

$$H_0' : x_i \text{ belongs to the triangle class} \quad (5)$$

$$H_1' : x_i \text{ belongs to the square class.}$$

Hence, in the new feature space $N_0/(N_0+N_1)=P(H_0')$, i.e. the probability of a feature vector being a triangle and similarly $N_1/(N_0+N_1)=P(H_0')$. Also $|d_1|/N_0=P(x=x_1|H_0')$ when $d_1<0$ because $|d_1|$ is the number of triangles at $x_1$ and $N_0$ is the total number of triangles in the feature space. Similarly, $|d_1|/N_1=P(x=x_1|(H_1')$ when $d_1>0$. Thus, the minimization problem may be rewritten in the new domain as follows:

$$\min_{R_0,R_1} \left[ P(H_1') \sum_{x_i \in R_0} P(x = x_i \mid H_1') + P(H_0') \sum_{x_i \in R_1} P(x = x_i \mid H_0') \right]. \quad (6)$$

At step 74 of FIG. 3A, a probabilistic model is constructed. According to one embodiment of the present invention, instead of using the discrete probabilities, the data are modeled using a continuous pdf consisting of a mixture of Gaussians. This is because in order to classify a feature vector the probability of occurrence of that vector is needed. However, the probabilities are not available for new input vectors that are not present in the training data set. By modeling the feature vector pdf using a mixture of Gaussians, any feature vector may be classified. The Gaussian mixtures are trained on the modified feature vectors using the Expectation Maximization (EM) algorithm, which is detailed in G. McLachlan et al., "The EM Algorithm and Extensions," Wiley Interscience, New York, N.Y., 1996, which is incorporated herein by reference. An example of trained Gaussian mixtures in the modified feature space is shown in FIG. 7.

The density function drawn with the dotted line in FIG. 7 corresponds to the data from the triangle class and the density function drawn with the solid line corresponds to the data from the square class.

Using continuous pdfs the minimization problem may be rewritten as follows:

$$\min_{R_0, R_1} \left[ P(H_1') \int_{x \in R_0} p(x \mid H_1') dx + P(H_0') \int_{x \in R_1} p(x \mid H_0') dx \right]. \quad (7)$$

The functions p(•) correspond to the continuous pdf comprising a mixture of Gaussians. This kind of minimization problem is equivalent to a minimum probability of error classification scheme in the new feature space that the regions may be determined using the likelihood ratio test. Such a classification scheme is detailed in R. O. Duda et al., "Pattern Classification and Scene Analysis," 1973 pp. 52–54, which is incorporated herein by reference. The likelihood ratio test may be written as:

$$\frac{p(x \mid H_1')}{p(x \mid H_0')} \underset{H_2}{\overset{H_1}{\gtrless}} \frac{P(x \mid H_0')}{P(x \mid H_1')}.$$

Hence, in order to classify a feature vector x at step 62 of FIG. 2, the likelihood ratio for it is calculated at step 76 of FIG. 3A. (Alternatively, the feature space may instead be partitioned as described hereinabove). As illustrated at steps 78 and 80 if the likelihood ratio exceeds the threshold obtained from training, $H_1$ is believed to be true and decision $D_1$ is made. Otherwise $H_0$ is believed to be true and decision $D_0$ is made. In summary, the likelihood ratio test defines the decision regions in the new space. As mentioned hereinabove, the regions that are determined to be in the new feature space are identically the regions that are desired to be in the original feature space. Thus, by transforming the feature space and mapping the problem to a well-understood minimization problem, the desired solution can be obtained.

The classification scheme may be summarized as follows. Given the training data and the cost differences, the feature space is transformed to a new feature space and then the apriori probabilities $P(H_0')$ and $P(H_1')$ are estimated and the class conditional probability density functions, $p(x|H_0')$ and $p(x|H_1')$, are calculated using the EM algorithm to train the Gaussian mixture. Once the pdfs are obtained, the likelihood ratio test is used for a new input feature vector corresponding to a coding unit and it is determined which of the two hypotheses is more likely to be true. Using this result, a decision $D_0$ or $D_1$ is made for that coding unit.

In one embodiment, the present invention may be used to make intra-inter mode decisions. Intra-inter mode decisions are made for every macroblock (a 16×16 region in a frame) in a video sequence. Intra coding involves coding using transform coding followed by quantization and entropy coding. Inter coding involves building a prediction for the current macroblock using data from the previous frame, using motion estimation and compensation and coding the residue using transform coding, quantization and entropy coding. For many macroblocks, Inter coding is more efficient in terms of compression. However, when there is a scene change or when there is a high motion sequence in the video, the prediction for the macroblock from the previous frame may be poor and in such cases it may be more efficient to use Intra coding as opposed to Inter coding. Hence, the encoder 12 may decide between these for every macroblock and the decision that requires fewer bits is often preferred.

Because converting to bits is computationally expensive, encoders use features as estimates for the bits. The energy (with dc value removed) in the block is used as an estimate of the bits needed for Intra coding and the mean absolute difference (MAD) is used as an estimate for the bits needed for Inter coding. For example, the mode decision as recommended by the Test Model Near Term (TMN-10) of the H.263 standard is:

$$\begin{cases} \text{Intra coding,} & \text{if } MAD - E_x > T \\ \text{Intra coding,} & \text{otherwise.} \end{cases} \quad (9)$$

For a 16×16 block $E_x = (1/256)\Sigma_{i=1}^{16}\Sigma_{j=1}^{16}|x_{i,j} - m_x|$ is the energy, $m_x$ is the mean or the dc value of the block and T is an empirically found threshold, specified in the TMN as 500.

The mean removed MAD (mrMAD) is tested as a feature to estimate the bits needed for Inter coding. This feature is similar to the MAD except that instead of taking the absolute pixel difference and summing them, the means are first removed from the blocks and then the absolute pixel difference is summed.

In order to collect training data the exhaustive test is performed for a variety of sequences and a sequence of values is generated for the features and a sequence of the optimal decisions. These exhaustive tests involve actually computing bits needed for Intra and Inter coding and making the right decision, i.e. the decision resulting in fewer bits. After collecting the sequence of right decisions and the values of the features, they are correlated with the decision sequence. The energy is correlated with the bits needed for Intra coding (correlation coefficient of 0.87). The MAD and the mrMAD are features representative of the bits needed for Inter coding. They have correlation coefficients of 0.90 and 0.94, respectively, with bits for Inter coding, independent of sequence. In order to test the suitability of using these features, they are correlated with the optimal decision sequence (one determined using the exhaustive test). The decision sequence is viewed as a sequence of +1s and −1s with +1 corresponding to Intra and −1 corresponding to Inter. Because generally, in order to compute the suitability of features to use in the classifier, the correlation coefficient between the features and the optimal decision sequence is computed. The optimal decision sequence is found using exhaustive schemes and is viewed as a binary sequence of +1s and −1s, corresponding to the two mode decisions. Before the feature sequence is correlated with the decision sequence, the feature sequence is thresholded to convert it to a binary sequence of +1s and −1s. This is done so that a better estimate of correlation between the feature sequence and the decision sequence is obtained. If the feature sequence is not converted to a binary sequence, even if the feature is perfectly representative of the decision sequence, i.e. it is high when Intra (+1) is decided and low when Inter (−1) is decided, a correlation coefficient of 1 is not obtained. Multiple thresholds are tried in order to convert every feature sequence into a binary sequence before correlating with the decision sequence and reporting the best correlation coefficient obtained.

The correlation coefficient between the decision sequence and energy is 0.32, between the decision sequence and MAD is 0.47 and between the decision sequence and mrMAD is 0.51. From these numbers it can be seen that the mrMAD is better correlated with the decision sequence than the MAD. Hence, this is chosen as a feature. Although the MAD has a higher correlation with the decision sequence than the energy, it is highly correlated with the mrMAD. Because the energy is representative of the bits needed for Intra coding, this feature may be used instead of the MAD, along with the mrMAD for the classification scheme.

Figure 8:
FIGS. 8 through 10 illustrate frames from three video sequences.
Figure 9:
Figure 10:

Feature vectors were collected from three sequences, frames of which are shown in FIGS. 8–10. FIG. 8 shows a "Coastguard" sequence frame, FIG. 9 shows a "Foreman" sequence frame, and FIG. 10 shows a "Silent" sequence frame.

The sequences were in 176×144 (QCIF) format at a frame rate of 30 Hz. Seventy-nine thousand two-hundred (79,200) feature vectors were collected, of which 5000 were used to train the classifier pdfs. The number of training vectors was small as compared to the test set, but using a larger training set did not improve the performance of the classifier significantly. Using the training data, the Gaussian mixtures were trained to obtain decision regions as shown in FIG. 11.

Figure 11:
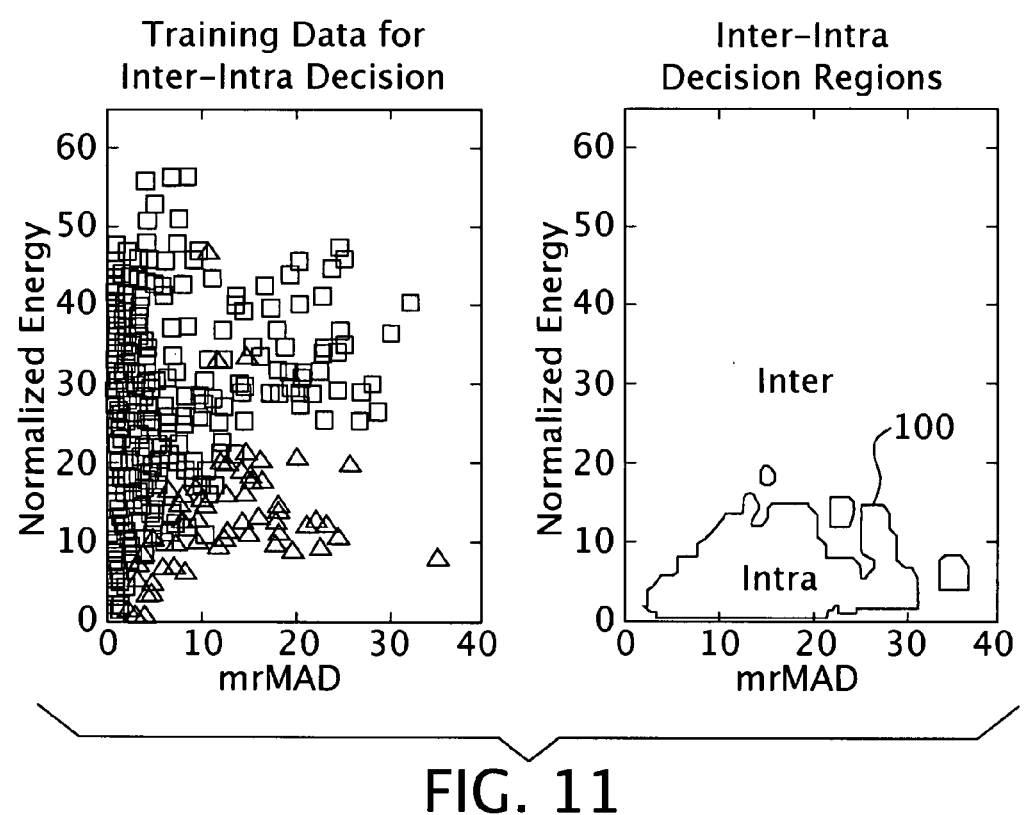
FIG. 11 illustrates Gaussian mixtures for making inter- and intra-mode decisions according to one embodiment of the present invention.

The plot in FIG. 11 shows 1,000 training feature vectors on the left with triangles corresponding to vectors that belong to the Intra class and squares corresponding to the Inter class. On the right the decision regions that were obtained after training Gaussian mixtures on the training data are shown with the Intra decision region enclosed inside the boundary 100. As shown in FIG. 11, the decision regions were representative of the training data and consist of disjoint sub-regions, as for the Intra case. From the training data it can be seen that a linear decision boundary was not suitable in this case. Thus, imposing no constraint on the shape of the decision boundary aids the classifier in finding a better decision boundary. In experiments, 98.2% correct classification was achieved using the minimum probability of error classifier. The classification result showed a variation of less than 1% across these different sequences. The classification scheme proposed in the TMN achieved around 92% correct classification because it used a linear decision boundary. Hence, the mode decision can be improved using this scheme. The mode decision was implemented in the H.263 framework and it was observed that the corresponding savings in total bit rate over the TMN decision (including residue bits, motion vector bits and overhead bits) were around 4.5~4.8% for different video sequences.

In one embodiment, the present invention may be used to make frame coding/skipping mode decisions. The goal of the frame coding/skipping mode decision is to decide between skipping and coding a frame in order to maximize the perceived quality while achieving a target bit rate. In order to collect training data for the classifier, an exhaustive search-based mode decision was implemented. The effect of skipping as well as coding a frame on the quality q and the bit rate r are computed before making a decision. In order to measure the perceived quality, a spatio-temporal quality metric described in S. Wolf et al., "Spatial-Temporal Distortion Metrics for In-Service Quality Monitoring of Any Digital Video System," SPIE Intl. Symposium on Voice, Video and Data Communications, Sep. 11–12, 1999, which is incorporated herein by reference, is used. In order to control the rate of coded frames, the quantization step size is changed using the inverse quadratic model to relate the bit rate with the quantization step size. This model is described in Chiang et al. "A New Rate Control Scheme Using Quadratic Rate Distortion Model," IEEE Transactions Circuits Systems Video Technology, Vol. 7, pp. 246–50, 9/97, which is incorporated herein by reference, and it relates the rate (r) to the quantization step size (Q) using $r=(a/Q)+(b/Q^2)$, where a and b are constants that may be estimated using training data. Such a model cannot capture the variation of bit rate with quantization step size across many different scenarios, so separate models, i.e. parameters a and b, for low motion, medium motion and high motion sequences may be trained.

The cost is defined as a combination of the quality and rate, defined as $q+\lambda r$, where the factor $\lambda$ is adjusted depending on application. The cost for the skipping or coding are compared and the one that requires the smaller cost is chosen. Simultaneously, the cost difference is chosen and some features that are used for training the classifier are evaluated. Using the method described hereinabove, the density functions are trained for the features and the classification-based scheme is implemented.

The exhaustive search-based mode decision is first described, and the features that are chosen for the classifier are then described, and the results of the implementation are given.

In the following, the video sequence is represented by a sequence of frames . . . X(n−1), X(n), X(n+1) . . . with n representing the time index. Because lossy compression techniques are used the sequence of decoded frames may be represented as . . . $\hat{X}$(n−1), $\hat{X}$(n), $\hat{X}$(n+1). These may not be identical to the original video sequence. The previous decoded frame is used as a reference to code the current frame and when a frame is skipped it is replaced by the previous decoded frame.

The steps for the exhaustive search-based mode decision are as follows. The rate and quality when a frame is skipped is computed. The previous decoded frame is replicated to simulate skipping the current frame. The quality $q_1$ of this sequence of two frames $\{\hat{X}(n-1), \hat{X}(n)=\hat{X}(n-1)\}$ is then estimated. The bit rate $r_1$ is estimated by averaging the bits needed to code the past ten frames, setting the bits for the current frame to zero and multiplying by the frame rate. The bit rate is estimated using a ten-frame window because it smoothes out the fluctuation due to a large or small number of bits to code the current frame.

Quality and bit rate for coding the frame are then estimated. The bits available to code the current frame are determined using history information and the target rate. The quantization step size needed to code the frame is estimated using the inverse quadratic model. Using the previous decoded frame as a reference and the computed quantization step size, the current frame is coded and reconstructed. The quality $q_2$ of the two-frame sequence $\{\hat{X}(n-1), \hat{X}(n)\}$ and the bit rate $r_2$ are computed as discussed hereinabove.

A comparison of $q_1+\lambda r_1$ with $q_2+\lambda r_2$ is made and a decision as to which of the two is better is made. The factor $\lambda$ can be specified by the user in terms of the relative importance of either the rate or the quality. In the tests a greater emphasis was placed on the quality of the sequence. This is done by adjusting $\lambda$ so that $\lambda$ times the target rate is 0.5 that is comparable to the range of the quality [−1, 0]. This is acceptable because the quadratic model is already used to try to control the bit rate. This exhaustive scheme is very similar to a Viterbi decoding scheme with no look-ahead allowed, because at every instant in time n, costs for both the paths (skipping the frame or coding it) are compared and the best path is chosen, with the other being discarded. This rate control strategy can be extended to allow for look ahead as described hereinbelow.

During the exhaustive mode decision certain features are evaluated. A large set of features is selected and the correlation of these features with the decision sequence of the exhaustive search-based mode decision is correlated to identify the features used for the classifier. Some of the initial features that were identified are described as follows:

a) MV Size: The size of motion vectors is computed as the sum of the square length of all the motion vectors in the frame.
b) SAD: This is obtained as the sum of the MAD across all the macroblocks of the frame. Used as a measure of quality of motion compensation.
c) High frequency energy (HFE): This is obtained by taking a frame, down-sampling it by a factor of 2 horizontally and vertically, then up-sampling it back to the original size, and finding the energy in the difference between this and the original frame. Down-sampling includes pre-processing by a low pass filter and up-sampling includes post-processing with a low pass filter.
d) Avail. Bits: Bits available to code current frame. This may be obtained from rate history.
e) Quant Step: Quantization step size used for current frame.
f) Frame Diff.: Energy in the frame difference between the current frame and the previous frame.

These features were collected across different sequences and across different target rates using the exhaustive search-based mode decision. The features were then correlated with the decision sequence that is viewed as a sequence of +1s and −1s, with +1 corresponding to skipping a frame and −1 corresponding to coding it. The correlation coefficient for each of the features is illustrated in Table I.

As can be seen from the table, most features are negatively correlated with the decision sequence and the quantization step size is positively correlated. This is because small motion vectors, small SAD, small HFE and a small frame difference all imply that the current frame can be well predicted by the previous frame, thereby denoting that they are similar. This means that the frame can be skipped, and it would then be replaced with the previous frame. This biases the decision toward not coding the frame or a +1. A smaller value of each of the features corresponds to a large value in the decision sequence, hence a negative correlation coefficient. A small number of available bits means that the quality of coding the frame will be poor, hence this also tends to bias the decision toward skipping the frame, thereby leading to a negative correlation. On the other hand a small quantization step size indicates that the quality of coding the frame will be good, thereby biasing the decision toward coding the frame and hence leading to a positive correlation coefficient.

TABLE I

CORRELATION COEFFICIENTS FOR FEATURES WITH DECISION SEQUENCE

| Sequence (Bit Rate kbps) | MV Size | SAD | HFE | Avail. Bits | Quant Step | Frame Diff. |
|---|---|---|---|---|---|---|
| "Foreman" (150) | −0.53 | 0.06 | −0.47 | 0.03 | 0.15 | −0.46 |
| "Foreman" (600) | −0.48 | −0.21 | −0.41 | −0.12 | 0.35 | −0.31 |
| "Coastguard" (150) | −0.33 | −0.06 | −0.52 | −0.09 | 0.26 | −0.07 |
| "Coastguard" (600) | −0.48 | −0.12 | −0.45 | −0.42 | 0.40 | −0.09 |

Among these features it can be seen that the size of motion vectors and the HFE have the largest correlation coefficient values across most sequences and most rates. They are also relatively uncorrelated with a correlation coefficient of 0.43. Hence, these are chosen as representative features for the test. The motion vectors are expensive to compute but they can be replaced with motion vectors from the previous frame because the correlation between them is relatively large at 0.87. The HFE for any frame of the sequence needs to be evaluated only once because it can be stored and looked up every time the sequence is coded irrespective of the target rates.

The density functions were trained for these selected features and the classification-based mode decisions were built. The mode decisions were evaluated over two different sequences—"Foreman" and "Coastguard." Both these sequences were CIF at a frame rate of 30 Hz. Of these sequences, "Foreman" is a high-motion sequence, and "Coastguard" is a medium-motion sequence.

Figure 12:
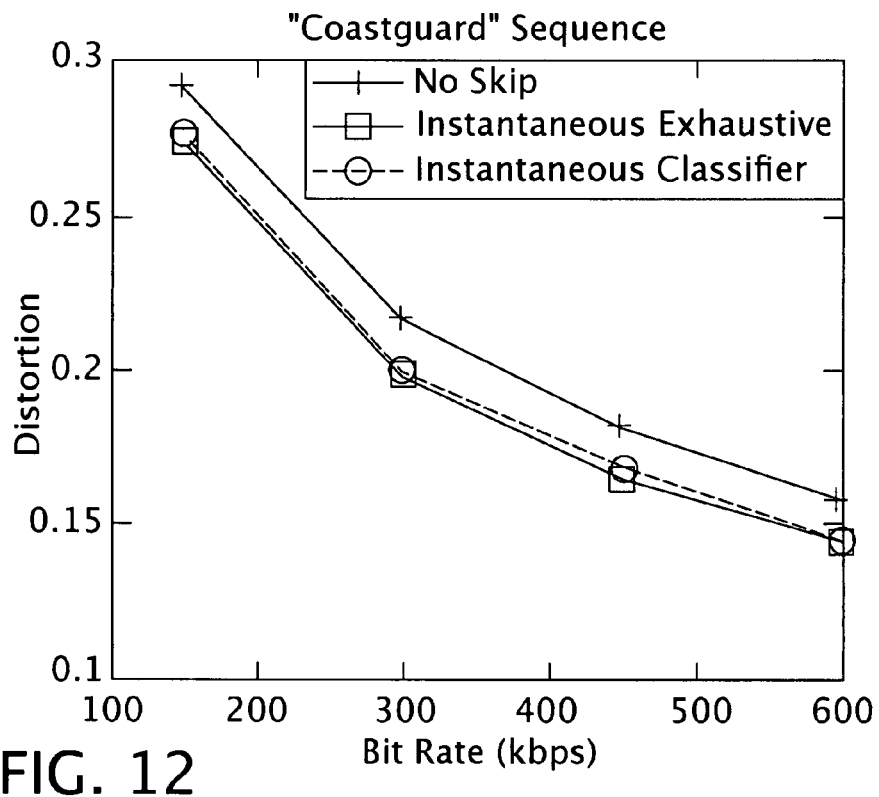
FIGS. 12 and 13 illustrate results of mode decisions for two video sequences according to one embodiment of the present invention.
Figure 13:
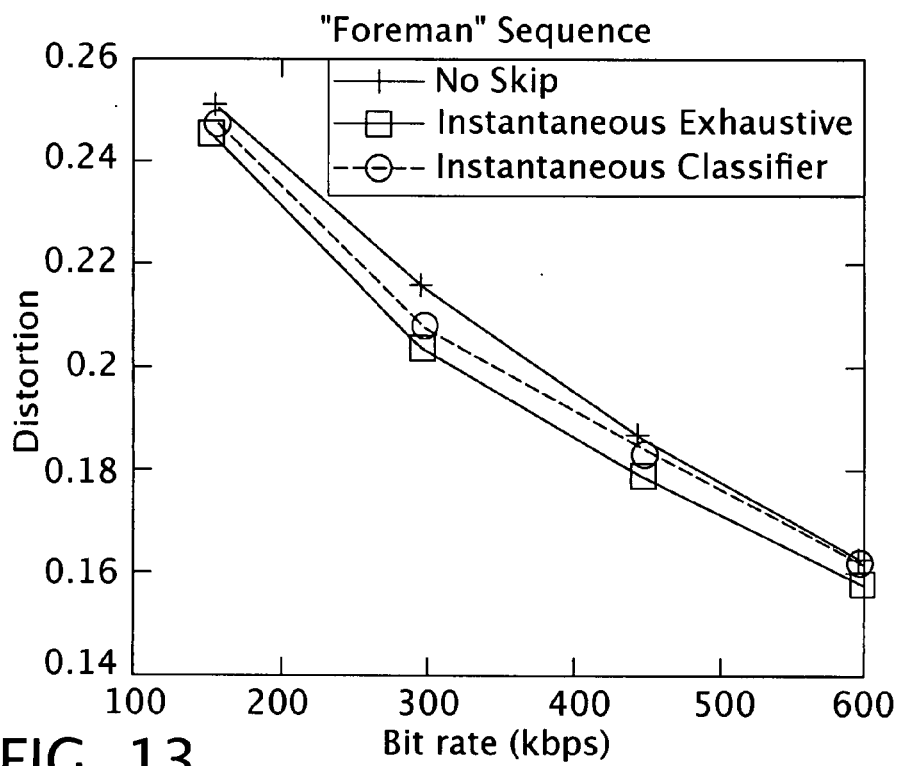

The results were evaluated using rate distortion curves. Four different target rates (150, 300, 450, and 600 kbps) were chosen for the test. The distortion was measured using the quality metric described hereinabove. The rate control was compared using the mode decisions with one that was termed "No Skip" rate control. This scheme tries to control the rate by only changing the quantization step size and skips a frame only when there are no bits available to code it. These results are shown in FIGS. 12 and 13.

The results show that rate control using both the exhaustive and the classification-based mode decision perform better than the "No Skip" rate control because they provide smaller distortion at the same target rate. The performance of the classification-based mode decision is close to the exhaustive search-based decision. The error probability for the classifier for "Foreman" is 0.171 and for "Coastguard" is 0.127. This leads to the classifier curve for "Foreman" not being as close to the exhaustive mode decision curve as it is for "Coastguard." It can also be seen that the average percentage improvement in quality across all the rates over the "No Skip" rate control is smaller for the "Foreman" sequence. This is because "Foreman" was a high-motion sequence, hence skipping a frame is worse in quality than coding a frame a majority of the time, thereby leading to fewer frames being skipped. In terms of computation requirements the exhaustive mode decision uses roughly 3.5 times the computation as the classification-based mode decision. The encoder with the classification-based mode decision has a computation complexity within 5% of an encoder with no rate control strategy.

The mode decision may be extended by allowing a one-step look-ahead before making a decision. The exhaustive approach is first described, followed by a description of the features that were selected and the results.

The steps in the exhaustive approach using look-ahead are as follows. The current frame is skipped and the previous decoded frame is replicated. The quality and the rate for this set of two frames $\{\hat{X}(n-1), \hat{X}(n)=\hat{X}(n-1)\}$ are computed as described hereinabove. Using the current reconstructed frame as a reference, the future frame is both coded and skipped. Quality and rate for the two frame sequences $\{\hat{X}(n)=\hat{X}(n-1), \hat{X}(n+1)=\hat{X}(n-1)\}$, when the future frame is skipped as well and $\{\hat{X}(n)=\hat{X}(n-1), \hat{X}_1(n+1)\}$, when the future frame is coded using the skipped frame as a reference, are computed.

The current frame is coded and quality and rate for $\{\hat{X}(n-1), \hat{X}(n)\}$ are computed. Using the coded frame as a reference the next frame is both skipped and coded. Quality and rate for $\{\hat{X}(n), \hat{X}(n+1)=\hat{X}(n)\}$, when the future frame and $\{\hat{X}(n), \hat{X}(n+1)\}$ are skipped, when the future frame is coded, are also computed.

The decision on coding or skipping the current frame is made after examining the total cost $(q_i+\lambda r_i)$ for each of the four paths (skip, code), (skip, skip), (code, skip) and (code, code). The path that provides the best cost is identified and the decision for the current frame is made appropriately. This strategy is very similar to the Viterbi decoding scheme with a one step look-ahead.

For the look-ahead classifier, the feature set that is started with is the same as discussed hereinabove. Of these features the size of motion vectors, the HFE and the quantization step size are the most representative features, i.e. they have the largest correlation coefficients with the decision sequence and have relatively low correlation between themselves. Of these features, identifying motion vectors requires a large amount of computation, so the motion vector size can be replaced with the motion vectors from the previous frame. However, it may not be good to approximate the future frame motion vectors with those from the previous frame because the correlation between the motion vectors that are two frames apart is not as large. Hence, using motion vector size as a feature for this decision strategy was rejected. The quantization step size for the current frame and those for future frames can be estimated using the model obtained. Four features were chosen for the classifier:

a) Quantization step size for current frame.

b) Estimate of quantization step size for future frame, if the current frame is skipped.

c) Estimate of quantization step size for future frame, if the current frame is coded.

d) HFE for the current frame.

All of these features are relatively easy to compute and, as stated before, the HFE for any frame needs to be evaluated only once for any sequence.

Figure 14:
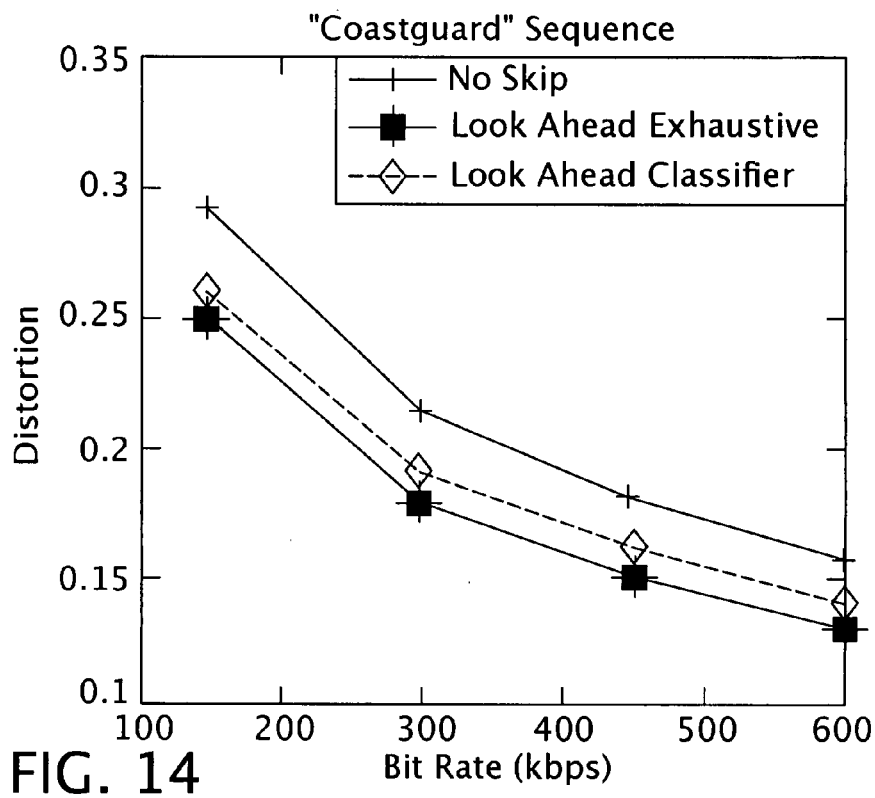
FIGS. 14 and 15 illustrate results of mode decisions for two video sequences according to one embodiment of the present invention.
Figure 15:
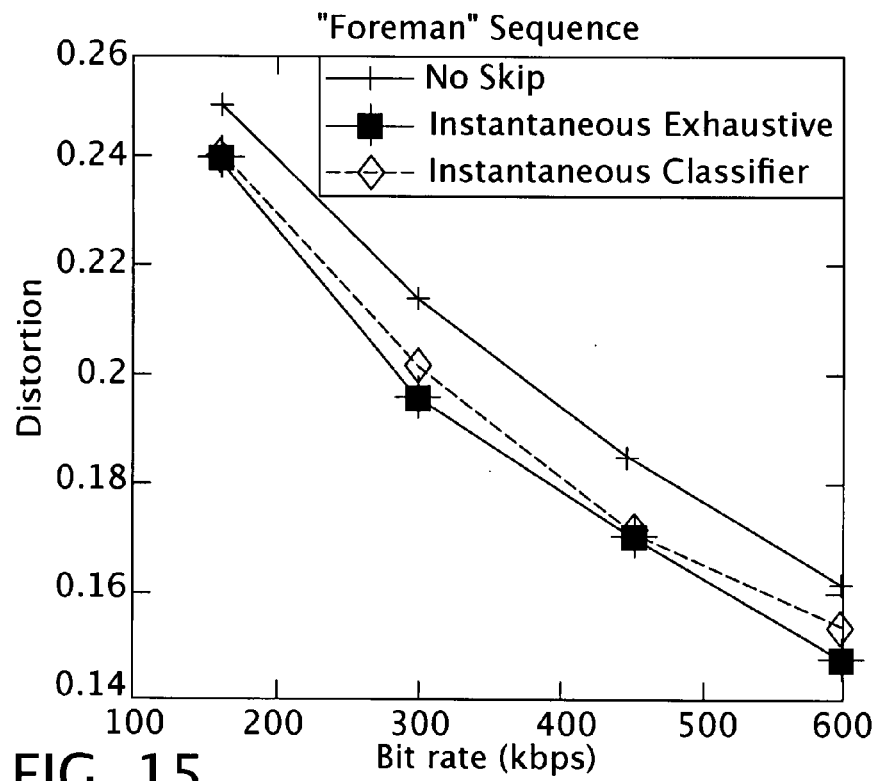

The look-ahead mode decisions were applied to the "Foreman" and "Coastguard" sequences and the results were compared with the "No Skip" rate control. These results are shown in FIGS. 14 and 15.

Rate control using both the exhaustive and the classification-based mode decision performed better than the "No Look" rate control. The performance of the look-ahead mode decisions was better than that of the instantaneous mode decisions. The error probability for the classifier for "Foreman" was 0.168 and for "Coastguard" was 0.202. Hence, the performance of the classifier was not as good as the exhaustive mode decision. The average percentage improvement in quality across all the rates over the "No Skip" rate control was smaller for the "Foreman" sequence because it is a high motion sequence. In terms of computation requirements the look-ahead exhaustive mode decision used roughly 8 times the computation as the classification-based mode decision. The encoder with the classification-based mode decision had a computation complexity within 5% of an encoder with no rate control. The number of steps that are allowed to look-ahead can be increased for a greater improvement in performance, because the classification-based mode decision does not require a significant increase in the computation requirements.

It has thus been shown that classification-based strategies can be used to decide between skipping a frame and coding it to achieve a better rate control strategy than just changing the quantization step size to control rate and use frame skipping only when there are no bits available to code the current frame. The discussion hereinabove was for rate control at the frame level, thus one quantization step size is used for the entire frame. However, the classification-based schemes of the present invention can be extended to macroblock layer rate control for use in deciding whether to skip or to code a macroblock.

The present invention is applicable to scalable coding. Scalable bitstreams are used by video coding schemes to improve error resilience over lossy networks. The bitstream is partitioned into multiple layers and consists of a base layer and one or more enhancement layers. The base layer is usually assigned the highest priority and error protection and possesses enough information for the decoder to reconstruct the video sequence at a lower resolution, frame rate or quality. The enhancement layers consist of residue information between the base layer and the actual video sequence, thereby allowing for reconstruction of the video at a higher resolution, frame rate or quality. There are three different scalabilities supported in the H.263 and MPEG-2 standards—the spatial, temporal and SNR scalabilities. In the spatial scalability, video at a lower resolution forms part of the base layer. In temporal scalability, the base layer consists of the video sequence coded at a lower frame rate, and in SNR scalability the base layer consists of the video sequence coded at a high quantization step size. Two of these scalability modes—temporal and SNR—are considered relevant to the skip or code mode decision mentioned herein above. The discussion hereinbelow is focused on the use of one enhancement layer, although the techniques may be extended to using multiple enhancement layers.

Temporal scalability is achieved by skipping frames while coding the base layer to obtain a lower frame rate video. Frames that are skipped are predicted (forward, backward or bi-directionally predicted) from the current and previous coded frames and the residue and motion vectors are included in the enhancement layer. SNR scalability is achieved by coding frames at a higher quantization step size at the base layer and then coding the residue between these frames and the actual video at a lower quantization step size to form the enhancement layer.

Using the mode decisions described hereinabove, a video sequence is sometimes coded by using a high quantization step size and sometimes by skipping frames. Hence, the coded video may be viewed as a base layer generated using an encoder that switches between SNR and temporal scalabilities, as detailed hereinbelow. The present invention can thus be used to investigate the error resilience and performance of the techniques described herein when implemented over lossy networks. To do this, an enhancement layer corresponding to the base layer is generated. When a frame is skipped in the base layer, a prediction for the frame that may be forward, backward or bi-directionally predicted from the preceding and following coded frames is built and the residue between the prediction and the original video is included as part of the enhancement layer. This is equivalent to temporal scalability.

The process of generating the enhancement layer when a frame is coded in the base layer is as follows. The coded frames are subtracted from the original video and the residue for each of the frames is included as part of the enhancement layer, which is coded at a lower quantization step size. This is equivalent to SNR scalability.

The coding scheme of the present invention switches between the two modes and is termed adaptive SNR/temporal (AST) scalable coding. Once the enhancement layer corresponding to the base layer has been built, it is coded at the same target rate as the base layer. In order to achieve the target rate, only the quantization step size is changed and skipping of frames is not allowed for. Lossy network conditions are simulated and the video sequence is reconstructed by combining the two layers. The lossy conditions are simulated by discarding some of the base layer macroblocks and some of the enhancement layer macroblocks and then combining the layers. Different error rates and their impact on the performance are examined. Some error concealment is used at the decoder side to improve the quality of the decoded video. When a base layer macroblock is corrupted it is replaced by the corresponding macroblock from the previous frame, and when an enhancement layer macroblock is corrupted, it is thrown away. An enhancement layer is also generated for the "No Skip" rate control scheme (identical to SNR scalability) and the layers are coded and combined as described hereinabove. The resulting rate distortion curves are plotted in FIGS. 16 and 17.

Figure 16:
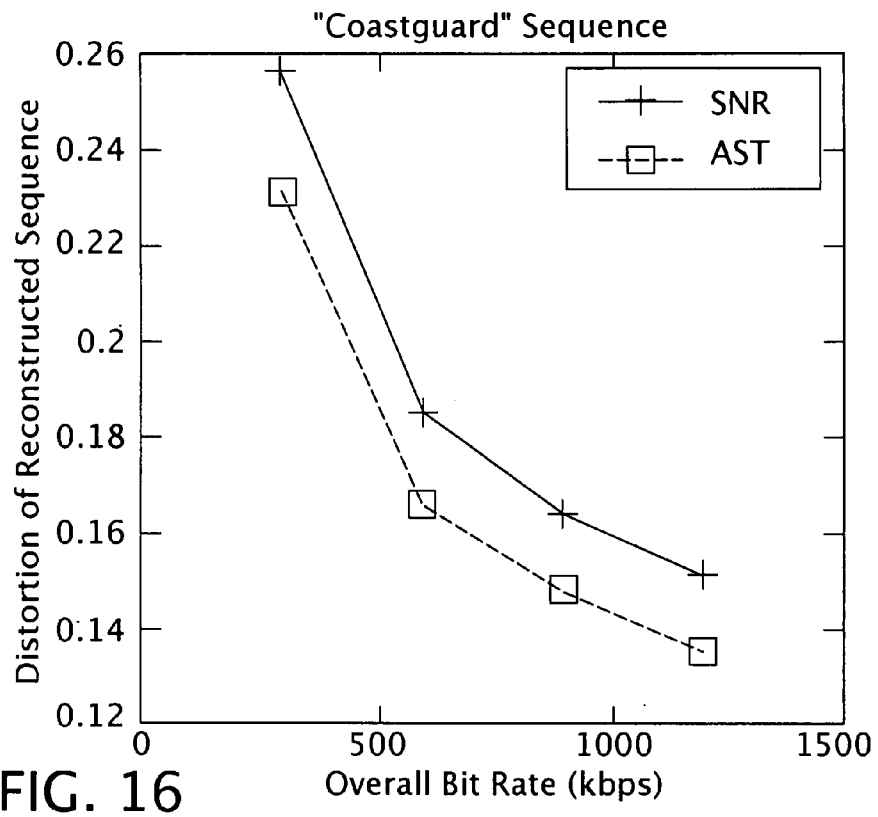
FIGS. 16 and 17 illustrate rate distortion curves for two video sequences according to one embodiment of the present invention.
Figure 17:
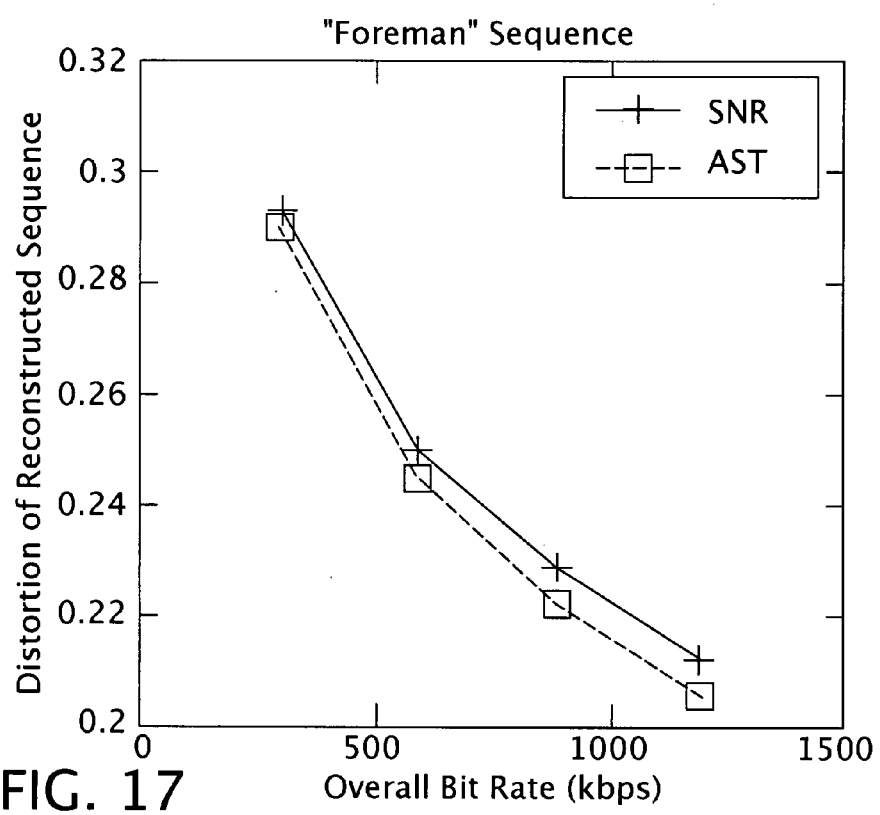
Figure 19:
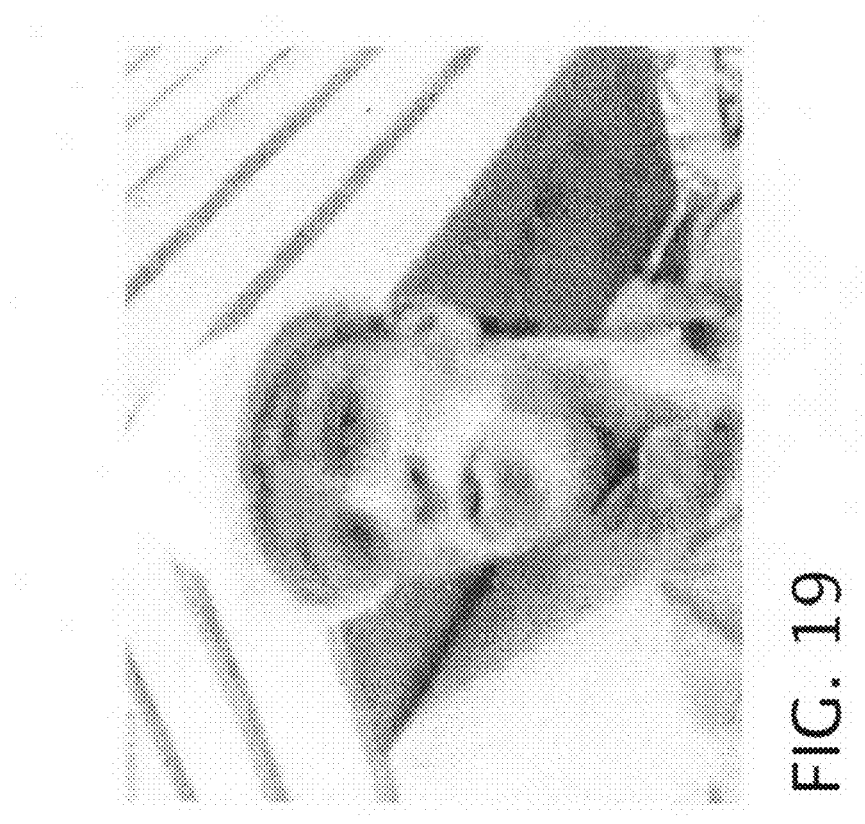
FIGS. 18 and 19 illustrate frames of a video sequence.
Figure 18:

The curves plotted in FIGS. 16 and 17 are with 5% loss in the base layer and 10% loss in the enhancement layer. As can be seen from the plots, the performance of the AST is better than using just SNR scalability across different target rates for both the sequences. Sample frames from the "Foreman" sequence to highlight the improvement in distortion are shown in FIGS. 18 and 19.

The SNR scalability frame had a PSNR of 27.7 dB and the AST scalability frame had a PSNR of 29.09 dB as compared to the original frame.

Figure 20:
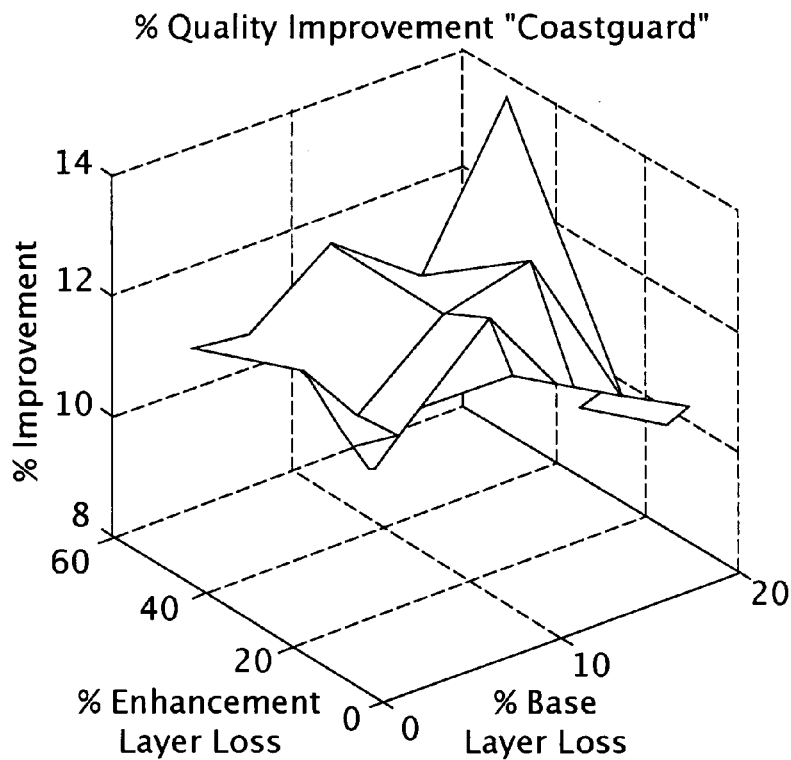
FIGS. 20 and 21 illustrate a quality improvement using SNR scalability according to one embodiment of the present invention.
Figure 21:
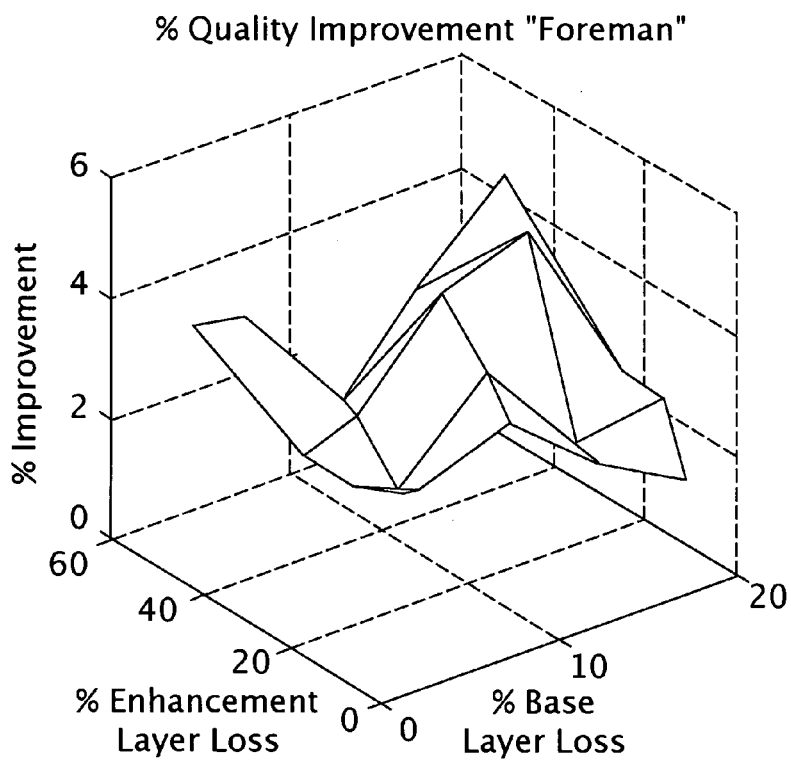

The effect of varying the enhancement layer and base layer losses at a fixed target rate of 300 kbps for base layer and 300 kbps for enhancement layer was also determined. The performance with SNR scalability was compared and the resulting improvements are shown in FIGS. 20 and 21.

Both plots are generated for a target rate of 300 kbps for the base layer and the same for the enhancement layer. For all the different error rates the performance in terms of quality is better when the base layer is generated using the classification-based mode decision as opposed to just changing the quantization step size. The percentage improvement in quality is higher for the "Coastguard" sequence than for the "Foreman" sequence. This may be explained by a combination of facts. When a frame is skipped, the enhancement layer carries a greater amount of information for high motion sequences than it would for a low motion sequence. Also, a larger amount of losses in the enhancement layer are present as compared to the base layer. More information is thus lost for higher motion sequences when frames are skipped in the base layer. Hence, there is a smaller improvement for the "Foreman" sequence. The case with 0% loss in the base layer and 100% loss in the enhancement layer degenerates to the rate control problem discussed hereinabove.

The present invention is directed to the classification-based approach to mode decisions in the video encoding process. The problem of minimization of a certain cost function is converted into a standard minimization of classification error problem and traditional pattern classification techniques are used to solve it. This approach can be used to improve the performance of the Inter-Intra mode decision and reduce the bitstream size by 4.5~4.8% over the mode decision as provided in TMN 10. The approach can also be used for the rate control problem to show an improvement in performance in the rate-distortion sense compared with using the no skip approach both for the instantaneous as well as the look-ahead mode decision. The improvement in quality for the instantaneous decision is 4~12% and for the look-ahead decision it is 7~18% over the no skip rate control. The present invention may also be used for scalable video coding and with the adaptive SNR/temporal (AST) scalability, the performance in terms of quality under error prone conditions is improved by 5~15% compared with using SNR scalability only.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for making a mode decision in video coding, comprising:
   collecting a first portion of video data;
   labeling the first portion of video data with an optimal mode;
   identifying at least one feature of the first portion of video data corresponding to the optimal mode, wherein identifying the at least one feature includes:
      defining at least one training feature vector and its cost relating to a unit of the first portion of video data; and
      defining a training feature space containing the feature vector;
   constructing a probabilistic model based on the at least one identified feature; and
   making a mode decision for a second portion of the video data based on an application of the probabilistic model to the second portion of the video.

2. The method of claim 1, wherein collecting a first portion of video data includes collecting a sample of the video data.

3. The method of claim 1, wherein identifying the at least one feature further includes
   partitioning the feature space.

4. The method of claim 3, wherein identifying the at least one feature further includes transforming the feature space.

5. The method of claim 1, wherein making a mode decision for a second portion of the video data based on an application of the probabilistic model to the second portion of the video includes:
   calculating a likelihood ratio for a unit of the second portion of the video using a value of the feature;
   selecting a hypothesis for the unit that is believed to be true; and
   making the mode decision based on the selected hypothesis.

6. The method of claim 1, wherein the mode decision is selected from the group consisting of an intra-/inter-mode decision and a frame skip/code decision.

7. A method of coding a sequence of video, comprising:
   extracting at least one sample unit of the video;
   defining at least one training feature vector and an associated cost with the vector for the sample unit;
   defining a training feature space associated with the feature vector;
   transforming the feature space;
   constructing a probabilistic model for the feature space;
   calculating a likelihood ratio for a second unit of the video;
   selecting a hypothesis that is believed to be true for the second unit of the video;
   making a mode decision based on the selected hypothesis; and
   coding the second unit of the video using the mode decision.

8. The method of claim 7, wherein the associated cost is associated with the mode decision.

9. The method of claim 7, wherein the mode decision is selected from the group consisting of an intra-/inter-mode decision, a frame type selection decision, and a frame skip/code decision.

10. The method of claim 7, wherein defining a training feature space associated with the feature vector includes associating the training feature vector with a hypothesis that is true for the training feature vector.

11. The method of claim 7, wherein transforming the feature space includes replacing the training feature vector with a plurality of vectors having no height.

12. The method of claim 7, wherein constructing a probabilistic model for the feature space includes constructing a Gaussian model for the feature space using an expectation maximization algorithm.

13. The method of claim 7, wherein selecting a hypothesis that is believed to be true for the second unit of the video includes selecting a hypothesis for which a likelihood ratio associated with the second unit of the video exceeds a threshold.

14. The method of claim 7, wherein making a mode decision based on the selected hypothesis includes making a first mode decision when the selected hypothesis is true and making a second mode decision when another hypothesis is true.

15. A video coding system, comprising:
a video encoder, the video encoder for:
collecting a first portion of video data;
labeling the first portion of video data with an optimal mode;
identifying at least one feature of the first portion of video data corresponding to the optimal mode, wherein identifying the at least one feature includes:
defining at least one training feature vector and its cost relating to a unit of the first portion of video data; and
defining a training feature space containing the feature vector;
constructing a probabilistic model based on the at least one identified feature; and
making a mode decision for a second portion of the video data based on an application of the probabilistic model to the second portion of the video; and
a video decoder in communication with the video encoder.

16. A video encoder including a set of instructions which, when executed by the encoder, cause the encoder to:
collect a first portion of video data;
label the first portion of video data with an optimal mode;
identify at least one feature of the first portion of video data corresponding to the optimal mode, wherein causing the encoder to identify the at least one feature includes causing the encoder to:
define at least one training feature vector and its cost relating to a unit of the first portion of video data; and
define a training feature space containing the feature vector;
construct a probabilistic model based on the at least one identified feature; and
make a mode decision for a second portion of the video data based on an application of the probabilistic model to the second portion of the video.

17. The encoder of claim 16, wherein the mode decision is selected from the group consisting of an intra-/inter-mode decision, a frame type selection decision, and a frame skip/code decision.

18. An apparatus, comprising:
means for collecting a first portion of video data;
means for labeling the first portion of video data with an optimal mode;
means for identifying at least one feature of the first portion of video data corresponding to the optimal mode, wherein means for identifying the at least one feature include:
means for defining at least one training feature vector and its cost relating to a unit of the first portion of video data; and
means for defining a training feature space containing the feature vector;
means for constructing a probabilistic model based on the at least one identified feature; and
means for making a mode decision for a second portion of the video data based on an application of the probabilistic model to the second portion of the video.

19. An apparatus, comprising:
means for extracting at least one sample unit of a sequence of video;
means for defining at least one training feature vector and an associated cost with the vector for the sample unit;
means for defining a training feature space associated with the feature vector;
means for transforming the feature space;
means for constructing a probabilistic model for the feature space;
means for calculating a likelihood ratio for a second unit of the video;
means for selecting a hypothesis that is believed to be true for the second unit of the video;
means for making a mode decision based on the selected hypothesis; and
means for coding the second unit of the video using the mode decision.

20. A method of coding a sequence of video, comprising:
extracting at least one sample unit of the video;
defining at least one training feature vector and an associated cost with the vector for the sample unit;
defining a training feature space associated with the feature vector;
transforming the feature space;
constructing a probabilistic model for the feature space;
partitioning the feature space into a plurality of regions;
selecting a hypothesis that is believed to be true for the second unit of the video;
making a mode decision based on the selected hypothesis; and
coding the second unit of the video using the mode decision.

* * * * *

UNITED STATES PATENT AND TRADEMARK OFFICE
CERTIFICATE OF CORRECTION

PATENT NO.       : 7,317,759 B1
APPLICATION NO.  : 10/085616
DATED            : January 8, 2008
INVENTOR(S)      : Turaga et al.

It is certified that error appears in the above-identified patent and that said Letters Patent is hereby corrected as shown below:

On the title page, under item (56), OTHER PUBLICATIONS, second column, line 14, delete "(lil+951+892+748)" and substitute --(lii+951+892+748)-- therefor.

On page 2, unde item (56), OTHER PUBLICATIONS, first column, line 17, delete "Overtapped" and substitute --Overlapped-- therefor.

In column 4, line 59, delete "| $d_1$<" and substitute --| $d_i$ |-- therefor.

In column 5, line 51, delete "$N_o = \Sigma_{d1<0}|d_1|$ and $N_1 = \Sigma_{d1<0}|d_1|$" and substitute --$N_o = \Sigma_{di<0}|d_i|$ and $N_1 = \Sigma_{di>0}|d_i|$-- therefor.

In column 6, line 10, delete "$|d_1|$ with $|d_1|$" and substitute --$|d_i|$ with $|d_i|$-- therefor.

In column 6, line 11, delete "$|d_1|$" and substitute --$|d_i|$-- therefor.

In column 6, lines 46-49, delete:

"Also $|d_1|/N_o = P(x=x_1/H_o')$ when d1<0 because $|d_1|$ is the number of triangles at $x_1$, and $N_o$ is the total number of triangles in the feature space. Similarly, $|d_1|/N_1 = P(x=x_1|H'_1)$ when $d_1$>0."

and substitute

--Also $|d_i|/N_o = P(x=x_i|H_o')$ when $d_i$<0 because $|d_i|$ is the number of triangles at $x_i$, and $N_o$ is the total number of triangles in the feature space. Similarly, $|d_i|/Ni = P(x=x_i|H'_1)$ when $d_i$>0.-- therefor.

UNITED STATES PATENT AND TRADEMARK OFFICE
CERTIFICATE OF CORRECTION

PATENT NO. : 7,317,759 B1
APPLICATION NO. : 10/085616
DATED : January 8, 2008
INVENTOR(S) : Turaga et al.

It is certified that error appears in the above-identified patent and that said Letters Patent is hereby corrected as shown below:

In column 8, line 26, delete "$E_x = (1/256) \Sigma_{i=1}^{16} \Sigma_{j=1}^{16} \Sigma_{j=1}^{16} | X_{i,j} - m_x |$" and substitute --  -- therefor.

Signed and Sealed this

Twenty-eighth Day of October, 2008

JON W. DUDAS
*Director of the United States Patent and Trademark Office*